United States Patent [19]
Cadden et al.

[11] Patent Number: 6,038,638
[45] Date of Patent: Mar. 14, 2000

[54] PAUSING AND RESUMING APPLICATIONS RUNNING IN A DATA PROCESSING SYSTEM USING TAPE LOCATION PARAMETERS AND PIPES

[75] Inventors: William Scott Cadden, Saugerties; David Alson George, Somers, both of N.Y.; Laurence Howell Lancaster, Tulsa, Okla.

[73] Assignee: International Business Machines Corporation, Armonk, N.Y.

[21] Appl. No.: 08/953,575

[22] Filed: Oct. 17, 1997

[51] Int. Cl.$^7$ .................................. G06F 9/46; G06F 9/38
[52] U.S. Cl. .......................... 711/111; 711/4; 360/78.02; 360/92; 360/91
[58] Field of Search ...................................... 711/100, 101, 711/111, 110, 112, 4; 360/69, 92, 91, 78.02, 95; 712/246; 707/202, 512, 524; 709/107, 108

[56] References Cited

U.S. PATENT DOCUMENTS

| | | | |
|---|---|---|---|
| 3,661,396 | 5/1972 | Sterly | 360/92 |
| 3,987,484 | 10/1976 | Bosche et al. | 386/69 |
| 4,685,125 | 8/1987 | Zave . | |
| 4,912,628 | 3/1990 | Briggs . | |
| 5,101,311 | 3/1992 | Richmond | 360/69 |
| 5,197,055 | 3/1993 | Hartung et al. | 369/34 |
| 5,345,430 | 9/1994 | Moe | 369/7 |
| 5,471,624 | 11/1995 | Enoki et al. . | |
| 5,898,843 | 4/1999 | Crump et al. | 360/39 |

OTHER PUBLICATIONS

"Request–Resume Command with Intervening Get–Set Command—When request is Issued, Calling Application Beings to Process Request and Service Application is Temporarily Frozen" Anonymous Pub. RD–323011–A, Mar. 10, 1991.

Primary Examiner—B. James Peikari
Attorney, Agent, or Firm—Floyd A. Gonzalez

[57] ABSTRACT

A system, method and program product for freeing tape drives so that long running jobs on a computer can be paused when other applications need the drives and restarted when the drives are available again. This is accomplished by pausing and resuming applications running on a computer including accessing a tape drive, on which is mounted a first tape, by a first application running on the computer, the accessing being through a pause/resume handler; pausing the first application responsive to an operator intervention to the pause/resume handler; storing parameters in the computer including location parameters indicating where the tape drive paused; mounting a second tape on the tape drive; and accessing the tape drive by a second application running on the computer. After the second application has completed access to the tape drive, the second tape is removed from the tape drive, and the first tape is remounted. The first application is resumed by an operator command to the pause/resume handler, and the pause/resume handler repositions the first tape to the location indicated by the stored location parameters so that the first application resumes at the same location on the first tape where it was paused by said operator intervention.

12 Claims, 4 Drawing Sheets

PAUSING AND RESUMING APPLICATIONS RUNNING IN A DATA PROCESSING SYSTEM USING TAPE LOCATION PARAMETERS AND PIPES

The present application relates to running applications in a data processing system, and more particularly relates to pausing and resuming the running of applications in a data processing system.

BACKGROUND OF THE INVENTION

Software applications sometimes must read or write very large files and run for long periods of time. They may run for as long as several days or weeks. As they run, they consume resources like CPU cycles, memory, tape drives, and disks. While such applications are running, it is sometimes desirable to pause them for a period of time so that higher priority work can be done. Operating system features are usually provided to suspend the job or make it lower priority, thus freeing up resources like memory and CPU cycles. However, such operating system features do not usually make tape drives available. This situation creates problems in computer installations where a great deal of information is stored on tapes. Tapes are often the only affordable way to store large amounts of data, and a shortage of tape drives therefore translates directly into a limitation on the number of applications that can be run.

A long running job could tie up tape drives for several days. It is desirable to provide that a long running job would use the tape drives only while no other jobs need them, however there may be no way to free the tape drives during the time when they are needed by other applications. If the long running job is not written with a pause and resume feature, it must have the tape drives during the entire time that it is running. To support more jobs, the computer installation must either have extra tape drives or carefully plan the execution of its jobs so that other applications will only be run while the long running jobs are not running. Long running applications may also be rewritten to have enough intelligence so that they can free the tape drives and then reallocate them upon request. Such rewriting may be costly and, further, must be placed into every long running application to be effective.

SUMMARY OF THE INVENTION

The present invention provides a method of freeing the tape drives so that the long running jobs can be paused when other applications need the drives and restarted when the drives are available again.

The present invention provides a method for pausing and resuming applications running on a computer, and includes accessing a tape drive, on which is mounted a first tape, by a first application running on the computer, the accessing being through a pause/resume handler; pausing the first application responsive to an operator intervention to the pause/resume handler; storing parameters in the computer including location parameters indicating where the tape drive paused; mounting a second tape on the tape drive; and accessing the tape drive by a second application running on the computer. After the second application has completed access to the tape drive, the second tape is removed from the tape drive, and the first tape is remounted. The first application is resumed by an operator command to the pause/resume handler, and the pause/resume handler repositions the first tape to the location indicated by the stored location parameters so that the first application resumes at the same location on the first tape where it was paused by said operator intervention.

It is thus a primary object of the present invention to provide a method of pausing the access of a first application to a tape drive such that a second application may have access to the tape drive, and then resuming access by the first application to the tape drive after access by the second application is complete.

It is another object of the invention to provide a method wherein a first tape is positioned on the tape drive during access by the first application, a second tape is positioned on the tape drive during access by the second application, and the first tape is repositioned on the tape drive when the first application is resumed in accordance with a parameter recording the position of the first tape when the first application was paused.

The foregoing and other objects, features and advantages of the invention will be apparent from the following more particular description of the preferred embodiment of the invention as illustrated in the drawings.

DESCRIPTION OF THE PREFERRED EMBODIMENTS

The present invention is usable with a computer, which may include personal computers, workstations or mainframes, which have access to and use tape drives to store data. The computers, referred to herein as machines, may be individual computers, or may include computers connected into networks of nodes, with each node including a processor. In accordance with the present invention, the individual node may be viewed as a machine, or the entire network of nodes may be viewed as a machine, depending on the machine having one or more applications needing access to a tape drive in which it is desired to pause one application such that the tape drive may be accessed by a second application. The present invention is usable with, for instance, the IBM RS/6000 SP system, and may be included in the CLIO/S product from International Business Machines Corporation of Armonk, N.Y.

Figure 1:
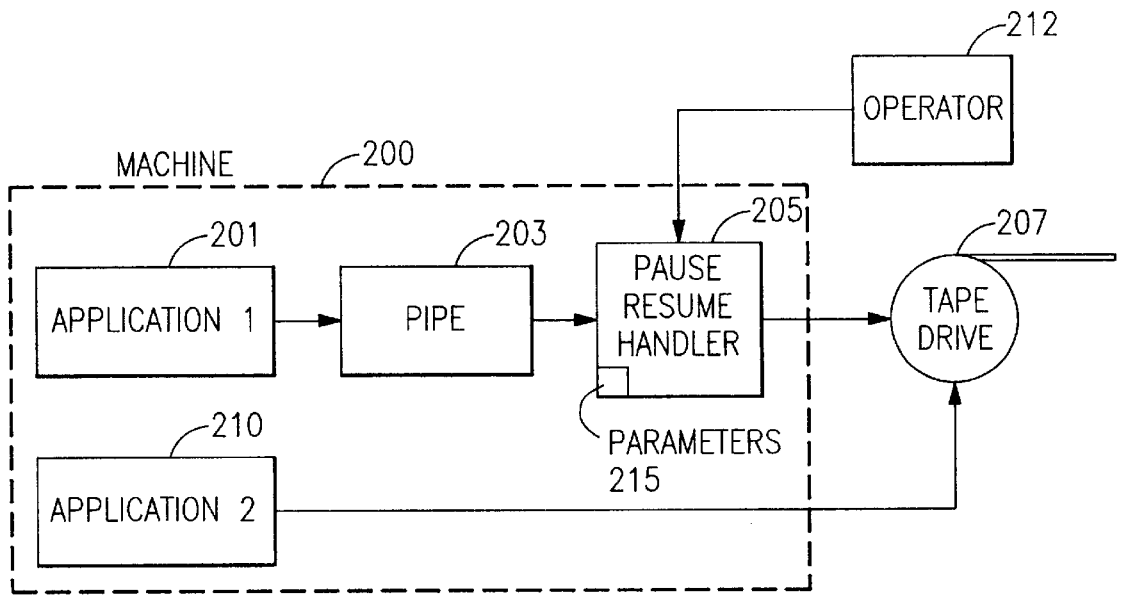
FIG. 1 is a block diagram showing a pair of applications connected to a pipe in a configuration to be emulated by the present invention.

FIG. 1 is a block diagram showing a first application 100 connected to a two-way pipe 101 by a write bus 103 and a read bus 105. Similarly, a second application 106 is connected to the pipe 101 by a write bus 108 and a read bus 110. It will be understood by those skilled in the art, that the present invention may also be used with a one-way pipe rather than the two-way pipe 101 discussed in connection with FIG. 1. Returning to FIG. 1, when the first application 100 wishes to write to the pipe 101, typically a signal is sent to the pipe 101 over the write bus 103, which may be a multi-bit bus as well understood by those skilled in the art, with data to inform the pipe 101 that it is about to receive data. Depending on the protocol used, the pipe 101 informs the application 100 that it is able to receive data, and, by communication back and forth, data is written from the application 100 to the pipe 101 over the write bus 103. In a similar manner, the application 100 may read data from the pipe 101 over the read bus 105 by sending a signal to the pipe 101 requesting the data. When the pipe 101 has the data, it informs the application 100. When the application 100 is ready to receive data, it informs the pipe 101, and the data is sent over the read bus 105, in a manner dependent on the exact protocol used. In the same manner, application 106 may write data to the pipe 101 over write bus 108, and read data from the pipe 101 over the read bus 110. Even though not shown, the pipe 101 communicates with a data storage device, such as memory, a tape drive, or a disk drive. This is not shown because, in the present invention, an application merely writes data to or reads data from a pipe, and the pipe is responsible for further handling the data. To interrupt, for instance, the writing of data from an application to the pipe, the communications between the application and the pipe are interrupted such that when the pipe indicates it is ready to receive data, the application does not respond, and the pipe pauses until the data is sent, the sending of data thereby resuming the writing of data. Likewise, when the application is reading data from the pipe, the pipe does not respond with data when the application indicates it is ready to receive data, thus pausing the reading of data until the pipe does respond with data, the response thereby resuming the reading of data.

Figure 2:
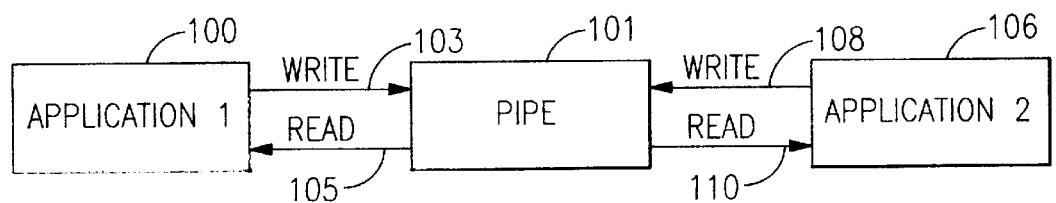
FIG. 2 is a block diagram of one embodiment of the invention wherein a first application is connected to a tape drive through a pipe and a pause/resume handler, a second application is connected to the tape drive, and an operator intervention to the pause/resume handler pauses the first application.

FIG. 2 is a block diagram of one embodiment of the invention, and includes a machine 200 having a first application 201 connected to a pipe 203. The pipe 203 may be a pipe as explained in U.S. patent application Ser. No. 08/898, 305, filed Jul. 21, 1997 for MANAGING DISTRIBUTED COMPLEX TASKS EXECUTING WITHIN A COMPUTER ENVIRONMENT (Attorney docket number PO9-97-011), owned by the assignee of the present invention and incorporated herein by reference. The pipe 203 is connected to a pause/resume handler 205 which is connected to a tape drive 207. The machine 200 also includes a second application 210 which is also connected to the tape drive 207. As explained in connection with FIG. 1, data transfers take place between the application 201 and the tape drive 207 through the pipe 203. The data transfers between the pipe 203 and the tape drive 207 are controlled by the pause/resume handler 205. The pause/resume handler can be commanded at any point during the transfer by an operator 212, to pause the transfer. When the handler 205 is paused, the handler will free the tape drive.

When the handler 205 frees the tape drive 207, the operator removes the tape from the first application 201 on the tape drive 207, and replaces it with a second tape for the second application 210. The second application 210 is then started, which performs data transfers to the second tape now on the tape drive 207. When the second application 210 is complete and it frees the tape drive 207, the second tape is removed, and the first tape is remounted on the tape drive. The operator then instructs the pause/resume handler 205 to resume the operation, and the first application 201 is once again given access to the tape drive. The pause/remove handler 205 stores the necessary parameters 215 to reposition the tape on the tape drive 207 to the position it was in when the pause/resume handler 205 was interrupted. In this way, the first application 201 may be resumed as before.

As discussed in connection with FIG. 1, at the point where the first application was paused during a read or write operation, it does not know that it has been paused. It simply requests more data from the pipe or sends more data to the pipe and waits for that operation to finish. It will wait indefinitely until the pause/resume handler is told to resume. At resume time, the pause/resume handler 205 will reallocate the tape, reposition the tape to the point at which it was reading or writing before it was paused, and then start reading or writing the tape again. The application 201 thus reads or writes its data and never knows that the pause/resume has taken place.

Although the invention is described in connection with a tape, the invention is useful for pausing applications that utilize any sequential read and write files.

The present invention may also be used to pause an application to replace a failed or failing tape drive without having to restart the application. In that case, the application is paused, the tape is removed, the tape drive is replaced with a new tape drive, the tape is remounted on the new tape drive, and the application is resumed.

Figure 3:
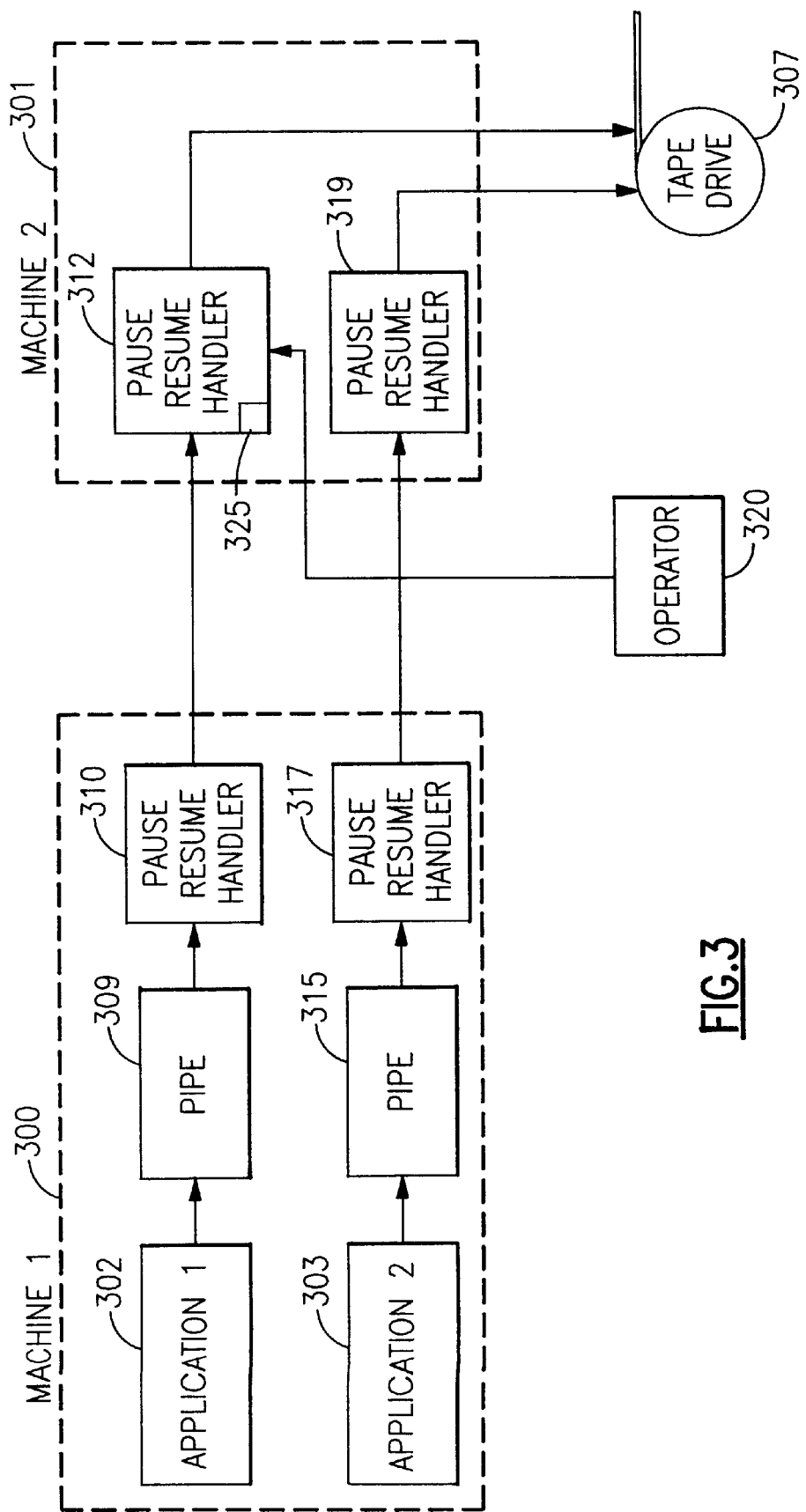
FIG. 3 is a block diagram of another embodiment of the invention wherein a pair of applications are on a first machine, a tape drive is on a second machine, and a pause/resume handler is provided to pause access by the first application to the tape drive responsive to an operator action such that the second application may have access to the tape drive.

FIG. 3 is a block diagram of another embodiment of the present invention wherein the applications 302 and 303 are on a first machine 300, and the tape drive 307 is connected to a second machine 301. This embodiment of the present invention allows accesses of tape data across a network. The application 302 transfers data to the tape drive 307 by means of a pipe 309 and a pause/resume handler 310 in the first machine 300, and a pause/resume handler 312 in the second machine. Similarly, data is transferred between the second application 303 and the tape drive 307 by means of a pipe 315 and a pause/resume handler 317 in the first machine 300 and a pause/resume handler 319 in the second machine 301. In the embodiment of FIG. 3, the operator 320 pauses the transfer of data from application 302 to the tape drive 307 by pausing the pause/resume handler 312, which frees the tape drive 307. As discussed in connection with FIG. 2, the parameters to reposition the tape on the tape drive 307 are stored in the pause/resume handler 312 at 325. The operator 320 may then mount a new tape on tape drive 307, and start application 303 on machine 300. The operator may allow the application 303 to complete, or may pause it by pause/resume handler 319, remount the tape for application 302, and resume pause/resume handler 312, as desired.

It will be understood that machine 2 may be a server for the tape drive 307, and may be removed from machine 1. In the embodiment of FIG. 3, the operator 320 pauses the pause/resume handler at his location without having to communicate with an operator at the location of the first machine 300. If, for instance, the operator 320 had been at the location of the first machine 300, the operator would pause the pause/resume handler 310 of machine 300 with the same results.

Figure 4A:
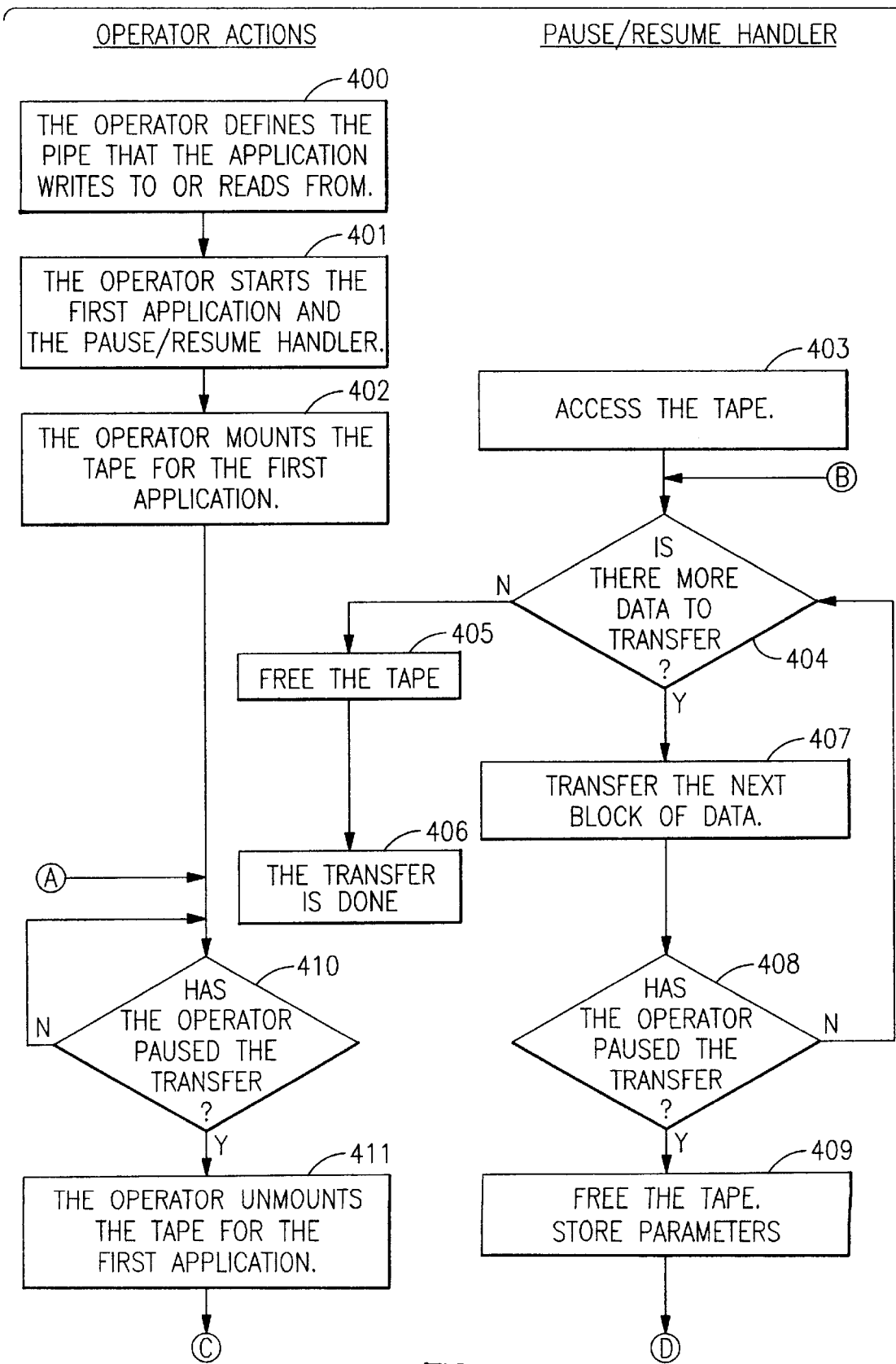
FIGS. 4A and 4B, connected by connectors A, B, C, and D, form a flow chart of a program of one embodiment of the invention.
Figure 4B:
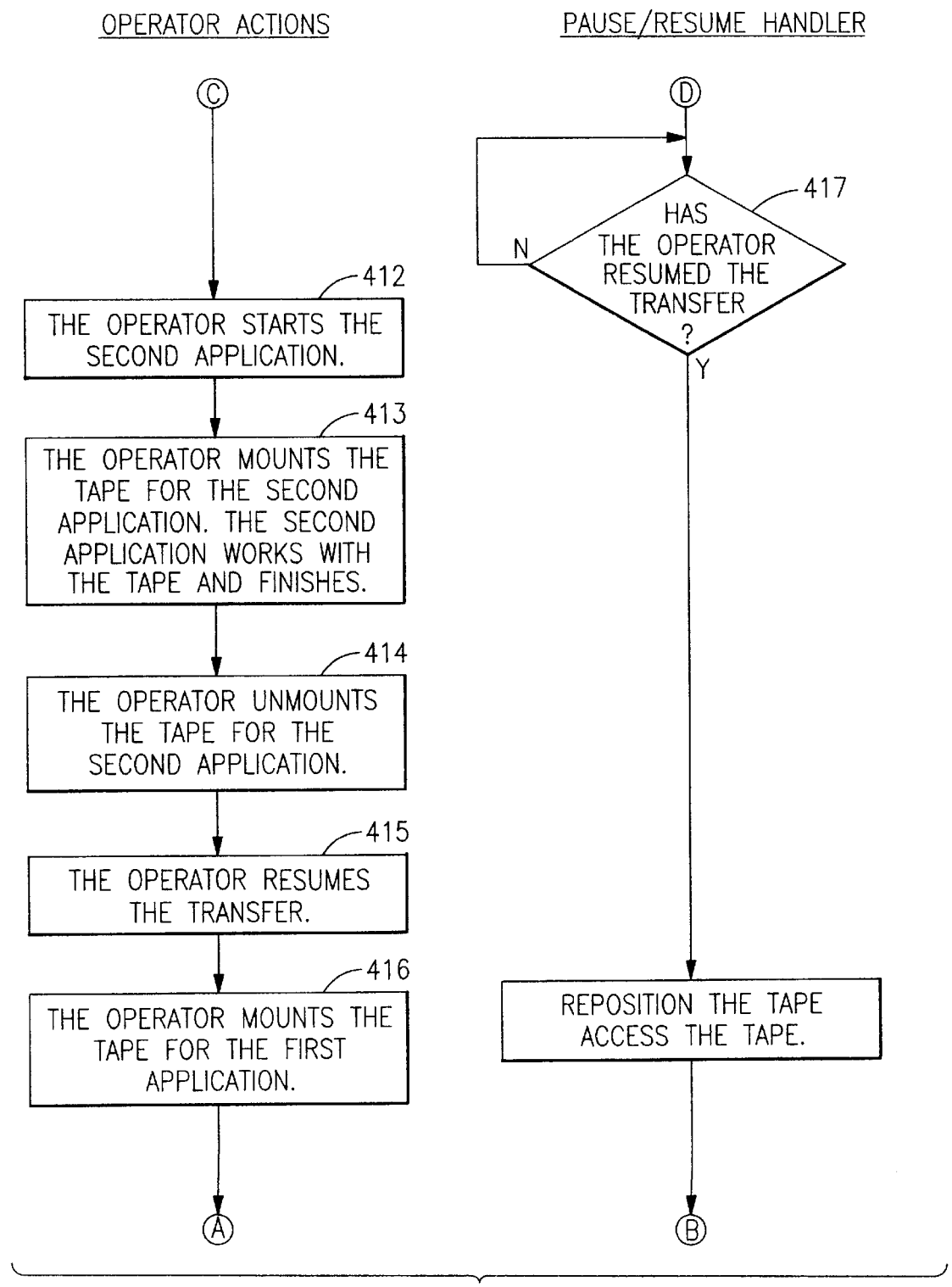

It will be understood the resume/pause handlers of FIGS. 2 and 3 may be implemented in computer programs or computer software. FIGS. 4A and 4B, joined by connectors A, B, C and D, form a flowchart of a program of one embodiment of the invention wherein the lefthand column shows operator actions, and the righthand column shows the actions programmed for the pause/resume handler of the invention. It will be understood that the columns are aligned side-by-side such that actions at the same level in the flowchart occur at the same time. At 400, the operator defines the pipe that the application writes to or reads from. At 401, the operator starts the first application and the pause/resume handler. At 402 the operator mounts the tape on the tape drive for the first application. At 403, in the righthand column, the pause/resume handler accesses the tape on the tape drive. At 404, the pause/resume handler checks to see if there is more data to transfer. It there is no more data, the pause/resume handler frees the tape drive at 405, and the transfer is done at 406. If the check at 404 is yes, the next block of data is transferred at 407. A check is then made at 408 to determine if the operator has paused the transfer. If no, the program returns to 404 to check if there is more data to transfer. If the operator has paused the transfer at 408, the pause/resume handler frees the tape from the tape drive, and stores the parameters indicating the position of the tape at the pause, as shown at 409.

Returning to the lefthand side, at 410, if the operator has paused the transfer by pausing the pause/resume handler, the operator unmounts the tape for the first application at 411. At 412 of FIG. 4B, the operator starts the second application, and mounts the tape for the second application at 413. The second application then works with the second tape until it finishes. At 414, the operator unmounts the tape for the second application, and resumes the transfer for the first application at 415. The operator then mounts the tape for the first application at 416, and returns to 410 wherein the operator waits for the next desired pause. Returning to the righthand side of FIG. 4B, the program of the pause/resume handler checks at 417 to see of the operator has resumed the transfer. The program continues to check at 417 until the operator resumes the transfer at 415. As soon as the transfer is resumed, the pause/resume handler repositions the tape, as indicated by the parameters stored at 409, and accesses the tape. The program then returns to 404 to continue to transfer data for the first application.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A method for pausing and resuming applications running on a computer, said method comprising:

accessing an active tape drive, on which is mounted a first tape, by a first application running on the computer, said accessing being through a pause/resume handler;

pausing the first application responsive to an operator intervention to the pause/resume handler, said first application being in a paused state awaiting data from said tape drive;

storing parameters in the computer including location parameters indicating where the first tape was positioned on the tape drive when the first application paused;

mounting a second tape on the tape drive;

accessing said second tape on said tape drive by a second application running on the computer;

after said second application has completed access to the tape drive, removing said second tape from said tape drive and remounting said first tape;

resuming said first application by an operator command to said pause/resume handler, said pause/resume handler repositioning said first tape to the location indicated by said stored location parameters, whereby said first application resumes at the same location on the first tape where it was paused by said operator intervention.

2. A system for pausing and resuming applications running on a computer, said system comprising:

an active tape drive on which may be mounted tapes to be accessed by a first application running on the computer;

a pause/resume handler between the first application and said tape drive, said first application accessing a first tape mounted on said tape drive through said pause/resume handler;

a pause routine in said pause/resume handler for pausing the first application responsive to an operator intervention to the pause/resume handler wherein said first application remains in a paused state awaiting data to be exchanged between said first application and said tape drive; and storage in said computer for storing parameters including location parameters indicating the position of the first tape on said tape drive when the first application paused;

said pause/resume handler allowing a second application running on the computer to access a second tape mounted on the tape drive until access by the second application is completed, and including a routine for resuming said first application by an operator command to said pause/resume handler, said pause/resume handler repositioning the first tape remounted on said tape drive to the location indicated by said stored location parameters, whereby said first application resumes at the same location on the first tape where it was paused by said operator intervention.

3. A program product recorded on a computer readable medium, said program product providing for a method for pausing and resuming applications running on a computer, said method comprising:

accessing an active tape drive, on which is mounted a first tape, by a first application running on the computer, said accessing being through a pause/resume handler;

pausing the first application responsive to an operator intervention to the pause/resume handler;

storing parameters in the computer including location parameters indicating where on the tape the tape drive paused;

maintaining said first application in a paused condition awaiting data to be exchanged between said first application and said tape drive for allowing the mounting of a second tape on the tape drive, accessing said second tape on said tape drive by a second application running on the computer until the second application has completed access to the tape drive, removing said second tape from said tape drive and remounting said first tape;

resuming said first application responsive to an operator command to said pause/resume handler; and repositioning said first tape to the location indicated by said stored location parameters, whereby said first application resumes at the same location on the first tape where it was paused by said operator intervention.

4. A system for pausing and resuming applications running on a computer, said system comprising:

a first machine having a first application for writing data to and reading data from a tape;

a second machine having a tape drive on which may be mounted a first tape to be accessed by the first application running on said first machine;

a pipe in said first machine connected to said application for passing data to and from said application;

a pause/resume handler between said pipe and said tape drive, said first application accessing a first tape mounted on said tape drive and writing data to and reading data from said first tape through said pipe and said pause/resume handler;

a pause routine in said pause/resume handler for pausing the first application responsive to a pause command to the pause/resume handler from an operator; and storage in said computer for storing parameters including location parameters indicating where on the first tape said tape drive paused;

said pause/resume handler allowing a second application running on the computer to access a second tape mounted on the tape drive until access by the second application is completed, and including a routine for resuming said first application responsive to a resume command to said pause/resume handler from the operator, said pause/resume handler repositioning the first tape remounted on said tape drive to the location indicated by said stored location parameters, whereby said first application resumes at the same location on the first tape where it was paused by said operator intervention.

5. The system of claim 4 wherein said pause/resume handler is in said first machine.

6. The system of claim 4 wherein said pause/resume handler is in said second machine.

7. The system of claim 4 wherein said pause/resume handler is in one of said first and second machines, and said system further comprises a second pause/resume handler at the other of said first and second machines for transferring data from and to said first application to said tape drive, the operator being at the location of either the first or second machine, the pause and resume commands being from the operator to the pause/resume handler at the same location as the operator.

8. The system of claim 4 wherein said storage is in said pause/resume handler.

9. The system of claim 4 wherein said pipe is a one-way pipe.

10. The system of claim 4 wherein said pipe is a two-way pipe.

11. A method for pausing and resuming applications running on a computer to allow the replacement of a tape drive, said method comprising:

accessing the tape drive, on which is mounted a tape, by an application running on the computer, said accessing being through a pause/resume handler;

pausing said application responsive to an operator intervention to the pause/resume handler;

storing parameters in the computer including location parameters indicating where on the tape the tape drive paused;

removing said tape from said tape drive;

replacing said tape drive with a second tape drive;

mounting said tape on said second tape drive; and resuming said application by an operator command to said pause/resume handler, said pause/resume handler repositioning said tape to the location indicated by said stored location parameters, whereby said application resumes at the same location on the tape where it was paused by said operator intervention.

12. A program product recorded on a computer readable medium, said program product providing for a method for pausing and resuming an application running on a computer, said method comprising:

accessing an active tape drive, on which is mounted a tape, by said application running on the computer, said accessing being through a pause/resume handler;

pausing said application responsive to an operator intervention to the pause/resume handler;

storing parameters in the computer including location parameters indicating the position of the tape on the tape drive when said application paused;

maintaining said application in a paused condition awaiting data to be exchanged between said first application and said tape drive for a desired period of time;

resuming said application responsive to an operator command to said pause/resume handler; and repositioning said tape to the location indicated by said stored location parameters, whereby said application resumes at the same location on the tape where it was paused by said operator intervention.

* * * * *